(12) United States Patent
Deorukhkar et al.

(10) Patent No.: US 11,084,930 B2
(45) Date of Patent: Aug. 10, 2021

(54) CO-SOLUBILIZATION PROCESS FOR PREPARING MODIFIED BITUMEN AND PRODUCT OBTAINED THEREOF

(71) Applicant: INDIAN OIL CORPORATION LIMITED, Mumbai (IN)

(72) Inventors: Amol Deorukhkar, Faridabad (IN); David Kochukutty, Faridabad (IN); Devotta Irudayaraj, Faridabad (IN); Naduhatty Selai Raman, Faridabad (IN); Madhusudan Sau, Faridabad (IN); Sanjiv Kumar Mazumdar, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 41 days.

(21) Appl. No.: 16/719,146

(22) Filed: Dec. 18, 2019

(65) Prior Publication Data
US 2020/0199366 A1   Jun. 25, 2020

(30) Foreign Application Priority Data
Dec. 19, 2018   (IN) .............................. 201821048195

(51) Int. Cl.
*C08L 95/00*   (2006.01)
*C08J 3/20*   (2006.01)

(52) U.S. Cl.
CPC ............. *C08L 95/005* (2013.01); *C08J 3/203* (2013.01); *C08J 2395/00* (2013.01);
(Continued)

(58) Field of Classification Search
CPC .............. C08L 95/005; C08L 2201/52; C08L 2555/84; C08J 3/203; C08J 2395/00; C08J 2409/06
(Continued)

(56) References Cited

U.S. PATENT DOCUMENTS

| 4,755,545 A | * | 7/1988 | Lalwani | ................. C09J 195/00 524/64 |
| 6,031,029 A | * | 2/2000 | Baumgardner | .......... C08K 3/32 524/68 |

(Continued)

FOREIGN PATENT DOCUMENTS

| CN | 103113751 A | * | 5/2013 |
| WO | 2010/037819 A1 | | 4/2010 |

OTHER PUBLICATIONS

Remtulla et al. "Properties of synthetic polymer modified bitumen concentrates and the effects of dilution by bitumen for application as binders", Australian Road Research Board (ARRB) Conference, 13th, 1986, Adelaide, Australia, Jan. 1, 1986 (Jan. 1, 1986) (Year: 1986).*

(Continued)

*Primary Examiner* — Michael Bernshteyn
(74) *Attorney, Agent, or Firm* — Maschoff Brennan (57) ABSTRACT

The present invention relates to a co-solubilization process for preparation of a polymer modified bitumen/asphalt and emulsified polymer modified bitumen/asphalt from bitumen, polymer, emulsifier etc. The present invention further relates to a polymer modified bitumen comprising bitumen and styrene-butadiene-styrene (SBS) linear co-polymer having high softening point. The present invention also relates to the use of the polymer modified bitumen and its emulsion in in micro-surfacing for maintenance of pavements.

11 Claims, 1 Drawing Sheet

(52) U.S. Cl.
CPC ....... *C08J 2409/06* (2013.01); *C08L 2201/52* (2013.01); *C08L 2555/84* (2013.01)

(58) Field of Classification Search
USPC .......................................................... 524/71
See application file for complete search history.

(56) References Cited

U.S. PATENT DOCUMENTS

2008/0015288 A1\*  1/2008  Antoine ................. C08L 95/00
                                            524/69
2018/0112074 A1\*  4/2018  Tibah ...................... C08L 95/00

OTHER PUBLICATIONS

Biro et al. "Asphalt rubber versus other modified bitumens", Road Materials and Pavements Design, vol. X, 2005, pp. 1-17. (Year: 2005).\*

\* cited by examiner

CO-SOLUBILIZATION PROCESS FOR PREPARING MODIFIED BITUMEN AND PRODUCT OBTAINED THEREOF

FIELD OF THE INVENTION

The present invention relates to a co-solubilization process for preparation of a polymer modified bitumen and its emulsion which are useful in construction and maintenance of bituminous pavements. The present invention further relates to polymer modified bitumen comprising bitumen and styrene-butadiene-styrene (SBS) linear co-polymer.

BACKGROUND OF THE INVENTION

Bitumen is thermoplastic in nature, water resistant and shows adhesion towards many other substances, and is a primary engineering material. There are over one hundred different industrial applications or products in which bitumen is used. Almost every home, building or traffic area uses bitumen in different form. Bitumen has been used widely ranging from the construction of the pavements of roads with an aggregate to waterproofing membrane in roofing and structural applications. Bitumen serves primarily as a binder in asphalt compacted mixtures which in turn are widely used in many types of road, street, runway and parking area applications. The other uses of bitumen are paints and coatings, paper, rubber products, electrical cables and other products of electrical industry etc.

Bitumen is a highly complex mixture of hydrocarbons and compounds of a predominantly hydrocarbon character, varying both chemically and in molecular size. It is a natural colloid composed of two phases, dispersed and continuous. These hydrocarbon components change from non-polar aliphatic wax compounds to highly polar condensed aromatics. Carbon and hydrogen constitute approximately 90-95% of bitumen. The rest of the bitumen consists of hetero-atoms such as nitrogen, oxygen and sulfur. The microstructure of bitumen is generally understood as multi-phase colloidal system and is classified into two categories sol-type bitumen and gel-type bitumen. In practice, most bitumen are somewhere between these two states depending on percentage of asphaltene present and its dispersion. The degree of dispersion of asphaltenes is controlled by the relative amounts of resins, aromatics and saturated oils present in bitumen. In sol-type bitumen, asphaltene is well dispersed. While in gel type bitumen, the asphaltene micelles are not well dispersed and form large agglomerations. As the ratio of aromatics increases, the dispersion of asphaltenes increases because the aromatics form stabilizing layer around the asphaltene micelles. The saturate oils have little solvent power in relation to the asphaltenes, so that as the saturate fraction increases, there is a great tendency for the asphaltenes to aggregate to form gel structure. However a high ratio of saturates tends to reduce viscosity because of their low molecular weight.

Bitumen emulsions employing a variety of applications are very well known in the art. These emulsions can be cationic, anionic or non-ionic depending upon the emulsifier. The set times can be rapid set, medium set and slow set. Asphalt has a wide variety of applications. These include paving of road and parking lot surfaces. In many instances the asphalt employed in these applications involve a "hot mix." Hot mixes involve heating the asphalt cement and mixing the aggregate into a molten mass at temperatures ranging from 250 to 350° F. Cut-backs have hydrocarbon solvents added to the asphalt to improve mixing at temperatures below normal hot mix parameters and to achieve the desired viscosity. However, both cut-backs and hot mixes have many disadvantages. An alternative to the hot mix applications is emulsion or cold mix application. Bitumen Emulsion involves using water and a variety of chemicals mixed in with the asphalt cement to create an emulsion. A break control agent is also added to control the break point of the emulsion.

In order for the emulsifier to perform its function as a cementing and waterproofing agent, the asphalt must separate from the water phase. Typically, emulsions are designed to break as the water is removed either through absorption in the aggregate, chemical reaction with the aggregate or from evaporation. This allows the asphalt droplets to coalesce and form a continuous film around the aggregate. The break or set time is the rate in which the asphalt droplets separate from the emulsion phase.

A significant problem within the industry is control of the emulsion's break point. The break point of an emulsion is influenced by a variety of variables. Composition variables include (1) the molecular structure of the emulsifier, (2) the quantities of the various components, (3) the efficiency of the break control agent, (4) the temperature of the mix components at the time of mixing, (5) ratio of all the components (6) aggregate type and gradation, (6) total amount of water in the mixture, (7) amounts and types of polymer, emulsifier and break control agent. Environmental variables include (1) surface temperature, (2) air temperature, (3) aggregate temperature, (4) amounts of sunshine, (5) wind speed, (6) humidity, and (7) rainfall before, during or after lay down of the micro-surfacing system. Construction factors also influence the break point which includes the type of equipment chosen to apply the micro-surfacing system and the skill of the crew operating the equipment.

Micro-surfacing systems involve the use of specialized equipment that have the ability to mix aggregate, portland cement, water, break control agents (solution or chemical) and a special type of extremely fast breaking polymer modified asphalt emulsion. This special type of extremely fast breaking polymer modified asphalt emulsion is called the micro-surfacing emulsion.

When applied in a predetermined thickness on a road surface or other terrain, a specialized piece of equipment referred to as a micro-surfacing machine, may operate continually as it travels the road or across the terrain being paved. Typically, the micro-surfacing system is used for resurfacing roads. However, the micro-surfacing system can be used to resurface parking lots, construct new parking lots and construct new roads. Once applied to the road surface, the micro-surfacing emulsion will then break and the asphalt will set, allowing the passage of rolling traffic in one hour. Rolling traffic is defined as the ability of the micro-surfacing system to withstand the pressure exerted by a standard 1500 to 2000 pound automobile traveling at 40 miles per hour. An acceptable micro-surfacing system will show no indentation or other markings or disfigurement to the surface at the end of the one hour time period.

The ability of the micro-surfacing system to handle rolling traffic within one hour makes it desirable for use in the construction or resurfacing of interstate highways, city freeway systems and any other areas where high volumes of traffic demand a road surface to be placed in a quick and expedient manner.

A major problem associated with emulsifiers is their poor adhesion to aggregates such as sand, gravel, crushed rock, slag and crushed limestone. A key requirement of the micro-surfacing system is the ability of the micro-surfacing emulsion to remain stable enough to completely coat and mix with the aggregate and other components of the mix before exiting the micro-surfacing machine regardless of the above indicated weather or construction conditions. The ability of the micro-surfacing emulsion to remain stable enough to mix with the aggregate and the other components and exit the machine is normally termed "controlling the break of the system."

It has often been a problem for those skilled in the art of emulsion technology and micro-surfacing emulsion technology, to control the break point of the micro-surfacing system with a given aggregate source, emulsifier type used in the micro-surfacing emulsion and the general weather conditions during actual placement of the micro-surfacing system. A need exists for a micro-surfacing system that will allow for greater flexibility and control of the type of aggregate selected for use, amount of cement present in the mix, the amount and type of break control agent in the mix. Meanwhile, maintaining the micro-surfacing emulsion or the mix at a temperature greater than 110 to 115° F.

The ability to satisfy the above stated needs will allow for more economic incentive to use the micro-surfacing systems in actual construction practice. Examples of some of the economic incentives will be lower quantities of micro-surfacing emulsion returned to the manufacturer due to poor field performance, more useful emulsifier system for making the micro-surfacing emulsion, the ability to use aggregates from locations closer to the construction site which lowers freight costs for the contractor and an overall improvement in the construction operation due to the improvements in the micro-surfacing system.

WO2010037819A1 relates to a process for preparing sulphur cross-linked polymer-modified bitumen. Sulphur, in the form of pellets of sulphur that comprise at least 0.25 wt % carbon black, is mixed with bitumen and polymer in an amount of from 0.5 to 20 wt %, based upon the weight of the polymer. Thus, the cross-linked polymer-modified bitumen formulation was prepared comprising bitumen, SBA (a very hard grade of bitumen), styrene-butadiene-styrene and sulphur pellets comprising carbon black in addition to other additives.

US2018112074A1 provides a method for producing polymer modified asphalt (PMA) using base asphalt (bitumen) blended with partially air blown ("puffed") asphalt which is further modified with polymers and additives to attain desired properties for industrial applications. The partially blown or blown asphalt is oxidized to a target softening point to suit the application.

U.S. Pat. No. 4,755,545A relates to a bituminous adhesive blend consisting essentially of: (a) a bituminous component comprising a road paving grade asphalt or a mixture of road paving grade asphalt and a hard resin asphalt in a weight ratio of between about 1:10 and about 10:1, (b) a thermoplastic block copolymer of styrene and butadiene wherein the weight ratio of styrene to butadiene is between about 1:1 and about 1:10; and (c) an inert filler.

Currently, conventional asphalt emulsion available in the market, after evaporation of water, generally has low softening point, and hence high temperature performance is insufficient. In terms of road use of the conventional asphalt emulsion, at high temperature, the road becomes weak resulting in weeping of road, causing damage to pavement rutting and other phenomena. When used in construction engineering, water preservation, etc., the conventional asphalt emulsion cracks at high temperature resulting in leaks and other phenomena. To avoid these problems, the softening point of the emulsified asphalt needs to be suitably improved so as to improve the high temperature stability of the asphalt. There are two common methods for improving the softening point of the emulsified asphalt. One of the methods is to prepare a modified asphalt modifier material which is then emulsified to obtain a polymer modified asphalt emulsion. Although the modified asphalt emulsion improves the high temperature performance of asphalt and the softening point of the pitch increases, but larger polymer modified bitumen cohesion makes emulsification difficult and the emulsifier does not give qualified emulsified asphalt. This method of preparing a modified asphalt emulsion is thus becomes a complex multi-step process. Another method is to prepare an emulsified asphalt, adding an emulsion polymer, resulting in an easy production method. Although domestic polymer emulsion can significantly improve emulsified asphalt temperature performance, compared with foreign polymer emulsion, improved high-temperature performance is relatively weak, the magnitude of increase is less than the softening point of application performance requirements, and imported polymer lotion is expensive, increasing the cost.

Figure 1:
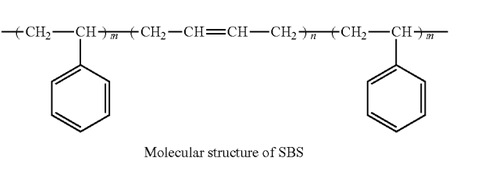
FIG. 1 Comparison of the general conventional manufacturing processes (A) of Polymer Modified Bitumen Emulsion (PMBE) with the present invention (B) producing PMBE with having high softening point

Many types of polymers are typically used in bitumen modification in different forms such as plastomers, elastomers and reclaimed rubbers, etc. The Styrene-Butadiene-Styrene copolymer, is commercially important and widely used in bitumen modification because of its physical characteristics like; high extensibility, elastic recovery, high resilience, sharp rise in elastic modulus at low temperature, not affected by water, alcohol, or diluted acids, soluble in ketones, esters and hydrocarbons etc. At ambient temperature, SBS is physically indistinguishable from conventional vulcanized elastomers, but chemically consists of individual chains with a complete absence of covalent crosslinks between the polymer chains. The molecular structure of SBS is shown in FIG. 1.

Molecular structure of SBS

Mixing polymers into bitumen has important consequences on the engineering properties of bituminous materials. The extent of modification and the improvements in the performance characteristics depend on bitumen nature, polymer chemical nature, its dosage and chemical compatibility, molecular weight, particle size, as well as blending process conditions such as type of mixing/dispersing device, time and temperature play important role in determining the modified asphalt properties. The molten state mechanical properties of polymer are affected mostly by molecular weight (mw) and molecular weight distribution. Bitumen modification by polymers improves its mechanical properties, increases the viscosity, allows an expansion of temperature range of service and improves the deformational stability and durability of bitumen.

In the manufacturing of polymer modified bitumen (PMB), it is important to understand interaction between bitumen and polymer, selection of base bitumen still has some important effects on the resulting PMB, as each bitumen has its own particular chemical composition and structure. Additionally, base bitumen usually comprises over 90% of the PMB by weight, which could introduce overriding influences on the final properties of the PMB and subsequent products developed thereof. Good-quality base bitumen helps to enhance the effects of polymer modification, while poor-quality one may make the modification futile. Thermoplastic elastomers are usually more effective than plastomers for bitumen modification. The most popular thermoplastic elastomers as bitumen modifier are styrene-butadiene-styrene (SBS) copolymers. SBS copolymers are composed of styrene-butadiene-styrene triblock chains with a biphasic morphology of rigid polystyrene (PS) domains (dispersed phase) in the flexible polybutadiene (PB) matrix (continuous phase). The chemical linkages between PS and PB blocks can immobilize domains in the matrix. Glass transition temperature (Tg) of PS blocks is around 95° C. and that of PB blocks is around −80° C. as reported in literature. Under the usual service temperatures of paving bitumen, PS blocks are glassy and contribute to the strength of SBS while PB blocks are rubbery and offer the elasticity. Furthermore, the incompatibility between PS and PB blocks makes it possible to physically crosslink PS blocks as uniformly distributed domains by intermolecular forces at ambient temperatures. This aggregation of PS blocks disappears at high temperatures when the kinetic energy of molecular thermodynamic movements is greater than the energy of intermolecular forces. However, the physical cross-linking among PS blocks can be reformed and the strength and elasticity of SBS can be restored after cooling, which is very important for SBS to be a popular bitumen modifier.

Regarding the compatibility between polymer and bitumen, selection of base bitumen is usually completed by laboratory experiments. However, some theoretical trends indicate that the SARA (saturates, aromatics, resins and asphaltenes) fractions of bitumen: for example, high asphaltene content decreases the compatibility between polymer and bitumen and the aromaticity of the maltenes needs to fall between certain values to reach a good level of compatibility. Asphaltenes are strongly polar components in bitumen and the polarity of polymer modifiers has a significant influence on their compatibility with bitumen and the final storage stability of the resulting PMBs. As for the attempts to overcome disadvantages of gel formation in PMB, various ways were reported to remove PMB's drawbacks, including sulfur vulcanization, adding antioxidants, using hydrophobic clay minerals and functionalization (including application of reactive polymers) etc.

A high content of asphaltene in bitumen decreases the compatibility of polymer in bitumen. Further, SBS polymer is not soluble or miscible in harder grade bitumen (as resin or oil base which assist or help in miscibility of polymer in bitumen is barely present or present in least amount). Therefore, polymer tends to form aggregates as solid lumps. Force dissolution of polymer (with or without milling or increasing temperature while stirring) in harder grade bitumen result in gelling of bitumen-polymer matrix. Therefore, polymer modified bitumen (PMB) cannot be formed due to lack of apparent miscibility of SBS in harder grade bitumen. Therefore, in many cases cross-linker or external additives are added to address compatibility issue which results in a costly process. SBS based Polymer Modified Bitumen Emulsions (SBS-PMBE) are a special class of bituminous emulsions prepared by emulsifying a SBS based polymer modified bitumen (SBS-PMB) with passing through the colloid mill. This SBS-PMBE must meet the necessary properties as laid in national and international specification prior to its use in micro-surfacing of pavement/road. One of such property is softening point of PMBE residue obtain thereof. The resulting PMBE shows improved properties of the residue after emulsion breaking (in particular present invention is targeting high softening point property). SBS-PMBE is harder to manufacture and their design and manufacturing must be performed with care in order to address their specificities.

OBJECTIVES OF THE INVENTION

The main object of the present invention is to provide a new product and a novel process for manufacturing of polymer modified bitumen emulsion (PMBE).

Another object of the invention, in particular, relates to process of preparation of polymer modified bitumen/asphalt and emulsified polymer modified bitumen/asphalt from bitumen, polymer, emulsifier etc.

Still another object of the invention is to provide use of as prepared modified asphalt with gravels in construction and maintenance of pavements.

SUMMARY OF THE INVENTION

Accordingly, the present invention provides a novel co-solubilization process for the preparation of polymer modified bitumen and polymer modified bitumen emulsion which is useful in micro-surfacing of flexible pavements (Bituminous Pavements/Roads). Further, the present invention provides a polymer modified bitumen comprising softer grade bitumen, styrene-butadiene-styrene (SBS) linear co-polymer and harder grade bitumen. The present invention thus relates to a two-step process for preparation of a polymer modified bitumen emulsion for micro-surfacing flexible pavements, wherein the process comprises:

(I) preparing a polymer modified bitumen, wherein the polymer modified bitumen comprises bitumen and styrene-butadiene-styrene (SBS) linear co-polymer; and (II) preparing a polymer modified bitumen emulsion by mixing an aqueous phase with an organic phase containing the polymer modified bitumen.

The present invention discloses a co-solubilization process for preparation of a polymer modified bitumen, the process comprising:

(a) heating a softer grade bitumen to a temperature ranging between 150-200° C.;

(b) adding styrene-butadiene-styrene (SBS) linear co-polymer for 10-20 minutes to the softer grade bitumen to obtain a mixture;

(c) dispersing the mixture obtained in step (b) at temperature ranging from 150-200° C. followed by milling to obtain a homogenous matrix;

(d) adding a harder grade bitumen to the homogenous matrix obtained in step (c) to obtain a mixture, wherein the mixture comprises styrene-butadiene-styrene (SBS) linear co-polymer in an amount ranging between 3-5% by weight of the mixture;

(e) stirring the mixture obtained in step (d) at a temperature ranging from 150-200° C. followed by milling to obtain the polymer modified bitumen;

wherein the polymer modified bitumen has a high softening point ranging from 60° C.-90° C.;

wherein the softer grade bitumen has absolute viscosity ranging from 800-1200 poise at a temperature of 60° C. and the harder grade bitumen has absolute viscosity ranging from 2400-3600 poise at a temperature of 60° C.

The present invention also provides a process for preparation of a polymer modified bitumen emulsion, the process comprising:
(a) heating a softer grade bitumen to a temperature ranging between 150-200° C.;
(b) adding styrene-butadiene-styrene (SBS) linear co-polymer 10-20 minutes to the softer grade bitumen to obtain a mixture;
(c) dispersing the mixture obtained in step (b) at a temperature ranging from 150-200° C. followed by milling to obtain a homogenous matrix;
(d) adding a harder grade bitumen to the homogenous matrix obtained in step (c) to obtain a mixture, wherein the mixture comprises styrene-butadiene-styrene (SBS) linear co-polymer an amount ranging between 3-5% by weight of the mixture;
(e) stirring the mixture obtained in step (d) at a temperature ranging from 150-200° C. followed by milling to obtain a polymer modified bitumen;
(f) optionally, mixing the polymer modified bitumen obtained in step (e) with an organic solvent to obtain an organic phase;
(g) mixing water, an acid, calcium chloride salt solution and an emulsifier to obtain an aqueous phase; and
(h) mixing the organic phase obtained in step (f) with the aqueous phase obtained in step
(g) by milling to obtain the polymer modified bitumen emulsion;
wherein the softer grade bitumen has absolute viscosity ranging from 800-1200 poise at a temperature of 60° C. and the harder grade bitumen has absolute viscosity ranging from 2400-3600 poise at a temperature of 60° C.

In another feature, the present invention provides a polymer modified bitumen prepared by the co-solubilization process comprising bitumen and styrene-butadiene-styrene (SBS) linear co-polymer in an amount ranging from 3-5% by wt of the polymer modified bitumen.

In yet another feature, the present invention provides polymer modified bitumen emulsion obtained by the above process comprising:
(a) 60 to 65 wt % of polymer modified bitumen;
(b) 0 to 5 wt % of organic solvent; and
(c) 35 to 40 wt % of aqueous phase;
wherein the wt % of each of the components is calculated based on the total weight of the emulsion.

Further, the present invention indicates that the polymer modified bitumen emulsion does not use any kind of stabilizer or cross-linking additive in the disclosed process.

DETAILED DESCRIPTION OF THE INVENTION

The present invention provides a cost effective co-solubilization process whereby a softer grade bitumen, which contain aromatics and lighter component that assist in dissolving higher dosage of SBS polymer, and harder grade bitumen are co-added in the blending process to for obtaining PMB and PMBE with desired polymer content and characteristics. Thus, the present invention provides a micro-surfacing product, PMBE with softening point more than 60° C. and to achieve this it is necessary to have high polymer content while maintaining the cost of product lower.

The present invention relates to a co-solubilization process for preparation of a polymer modified bitumen and polymer modified bitumen emulsion which are useful in micro-surfacing of flexible pavements (Bituminous pavements/roads). The present invention further relates to a polymer modified bitumen comprising bitumen and styrene-butadiene-styrene (SBS) linear co-polymer. The present invention also relates to a Styrene-Butadiene-Styrene (SBS) based Polymer Modified Bitumen Emulsion (PMBE) which has higher Polymer concentration and is prepared without any stabilizer/cross linker additive.

The present invention thus relates to a two steps process for the preparation of modified bitumen emulsion for micro-surfacing flexible pavements, wherein the process comprises:
(I) preparing a polymer modified bitumen, wherein the polymer modified bitumen comprises bitumen and styrene-butadiene-styrene (SBS) linear co-polymer; and
(II) preparing a polymer modified bitumen emulsion by mixing an aqueous phase with an organic phase containing the polymer modified bitumen.

According to the main feature, the present invention provides a co-solubilization process for preparation of a polymer modified bitumen, the process comprising:
(a) heating a softer grade bitumen to a temperature ranging between 150-200° C.;
(b) adding styrene-butadiene-styrene (SBS) linear co-polymer for 10-20 minutes to the softer grade bitumen to obtain a mixture;
(c) dispersing the mixture obtained in step (b) at a temperature ranging from 150-200° C. followed by milling to obtain a homogenous matrix;
(d) adding a harder grade bitumen to the homogenous matrix obtained in step (c) to obtain a mixture, wherein the mixture comprises styrene-butadiene-styrene (SBS) linear co-polymer in an amount ranging between 3-5% by weight of the mixture; and
(e) stirring the mixture obtained in step (d) at temperature ranging from 150-200° C. followed by milling to obtain the polymer modified bitumen;
wherein the polymer modified bitumen has a high softening point ranging from 60° C.-90° C.;
wherein the softer grade bitumen has absolute viscosity ranging from 800-1200 poise at a temperature of 60° C. and the harder grade bitumen has absolute viscosity ranging from 2400-3600 poise at a temperature of 60° C.

In an embodiment, the steps (a), (c) and (e) in the co-solubilization process of preparation of the polymer modified bitumen are preferably performed at a temperature range of 160-170° C.

In another feature, the present invention also provides a process for preparation of a polymer modified bitumen emulsion, the process comprising:
(a) heating a softer grade bitumen to a temperature ranging between 150-200° C.;
(b) adding styrene-butadiene-styrene (SBS) linear co-polymer for 10-20 minutes to the softer grade bitumen to obtain a mixture;
(c) dispersing the mixture obtained in step (b) at a temperature ranging from 150-200° C. followed by milling to obtain a homogenous matrix;
(d) adding a harder grade bitumen to the homogenous matrix obtained in step (c) to obtain a mixture, wherein the mixture comprises styrene-butadiene-styrene (SBS) linear co-polymer in an amount ranging between 3-5% by weight of the mixture;

(e) stirring the mixture obtained in step (d) at a temperature ranging from 150-200° C. followed by milling to obtain a polymer modified bitumen;

(f) optionally, mixing the polymer modified bitumen obtained in step (e) with an organic solvent to obtain an organic phase;

(g) mixing water, an acid, calcium chloride salt solution and an emulsifier to obtain an aqueous phase; and (h) mixing the organic phase obtained in step (f) with the aqueous phase obtained in step (g) by milling to obtain the polymer modified bitumen emulsion;

wherein the softer grade bitumen has absolute viscosity ranging from 800-1200 poise at a temperature of 60° C. and the harder grade bitumen has absolute viscosity ranging from 2400-3600 poise at a temperature of 60° C.

In a preferred embodiment, the SBS linear co-polymer is added to the softer grade bitumen in step (b) of above processes for 15 minutes.

In an embodiment, the steps (a), (c) and (e) in the process of preparation of the polymer modified bitumen emulsion are preferably performed at a temperature range of 160-170° C.

In an embodiment, the styrene-butadiene-styrene (SBS) linear co-polymer is added in step (b) of the co-solubilization process in an amount ranging from 15-20% by weight of softer grade bitumen. The mixing of 15-20% of SBS polymer in softer grade bitumen (VG10) at 150-200° C. and then adding required amount of harder grade bitumen (VG30) enables to attain a final PMB and PMBE concentration with 3-5 wt % of SBS modified bitumen having softening point of PMBE residue greater than 60° C.

In a preferred feature, milling of the mixture obtained in steps (c) and (d) of the co-solubilization process is done for 20-30 mins to reduce polymer particle size.

In another preferred feature, the mixture obtained in the steps (c) and (d) of co-solubilization process is stirred with an agitator for 2-3 hrs.

In yet another embodiment, the aqueous phase for the preparation of the emulsion comprises 0.5-2 wt % of acid, 0.2-0.5 wt % of calcium chloride, 0.25-1.5 wt % of emulsifier and water. Further, the aqueous phase comprises an acid, wherein the acid in the aqueous phase is a mineral acid preferably sulfuric acid, hydrochloric acid and nitric acid, more preferably the acid is hydrochloric acid. Again, the emulsifier in the aqueous phase is secondary and/or tertiary amine, preferably long chain fatty amines (for examples Polyram L920, Redicote 500, Rodhaval CS6 and others).

In another embodiment, the organic solvent used in the preparation of the emulsion is Straight run Kerosene Oil (SKO) or Mineral Turpentine Oil (MTO) etc.

In a preferred embodiment, the organic phase is maintained at a temperature ranging between 140-150° C. and the aqueous phase is maintained at a temperature ranging between 40-50° C.

In another feature, the present invention provides a polymer modified bitumen prepared by the co-solubilization process comprising bitumen and styrene-butadiene-styrene (SBS) linear co-polymer, wherein the SBS polymer is present in an amount ranging from 3-5% by weight of the polymer modified bitumen.

In yet another feature, the present invention provides polymer modified bitumen emulsion obtained by the above process comprising:

(a) 60 to 65 wt % of polymer modified bitumen;

(b) 0 to 5 wt % of organic solvent; and (c) 35 to 40 wt % of aqueous phase;

wherein the wt % of each of the components is calculated based on the total weight of the emulsion.

Upon addition of SBS copolymers into bitumen, the intermolecular interactions between bitumen and the PB blocks are stronger than those with the PS blocks indicating that the PB blocks interact with positively charged groups in bitumen through their π-electrons, whereas PS blocks interact with electron-rich groups in bitumen through their aromatic protons. Mixed with bitumen, PS blocks in SBS copolymers absorb some saturated branches and a few rings in light components of bitumen, which leads to the swelling of PS blocks and the hardening of bitumen. When the polymer content is low, SBS is dispersed as a discrete phase in the bitumen. As the SBS concentration increases, phase inversion starts in the modified bitumen. Within the SBS-rich phase, there are two sub-phases: swollen PB matrix and essentially pure PS domains.

Bitumen with high aromatic content helps in producing a compatible and stable SBS modified bitumen and addition of aromatic oils improve the compatibility between SBS and some bitumen with low aromatics content. Too high aromatic content in modified bitumen, however, leads to the swelling and anti-plasticization of some PS blocks, which is not good for the resulting properties of the modified bitumen. Thus, softer and harder grade bitumen are together chosen for preparation of PMB with high polymer (SBS) content without any catalyst or additive and without gel formation. Further, the softening point of PMB and PMBE being much higher than the conventional one, the present invention favours the usability of the emulsion in terms of road application preventing weeping of roads resulting in damage of pavements that might lead to leaks and other adverse phenomenon in roads.

In yet another feature of the present invention, the emulsion serves as an extremely fast breaking polymer modified asphalt emulsion called a micro-surfacing emulsion and finds its application for micro-surfacing flexible pavements, construction and maintenance of roads and pavements. The emulsion also favours resurfacing of existing parking lots and construction of new parking spaces.

The following examples are given for the purpose of further illustrating the invention. All percentages and parts are based on weight unless otherwise indicated.

Chemical Used for the Process of Preparation of PMB and PMBE:

1. VG10 Grade Bitumen: Softer Grade Bitumen having Absolute Viscosity at 60° C. [ASTM D2171 and IS 1206 (Part 2)] in the range of 800-1200 Poise.

2. VG30 Grade Bitumen: Harder Grade Bitumen having Absolute Viscosity at 60° C. [ASTM D2171 and IS 1206 (Part 2)] in the range of 2400-3600 Poise.

3. SBS (Linear) (501W) Polymer used from M/s LG Chemicals Ltd Korea.

4. Various emulsifiers were used as supply from different sources.

5. Chemicals like Hydrochloric acid (HCl) and Calcium Chloride ($CaCl_2$) were supplied locally.

6. M/s ENH Ltd Denmark bitumen modification and bitumen emulsion laboratory scale R&D plants were used for study.

Experimental Work: Manufacturing Process of PMB is as Follows:

1. Manufacturing of Precursor PMB for PMBE:

2 kg of Softer grade bitumen/vacuum residue (say VG10 in this case) was heated in pilot plant to attain a temperature of about 150-170° C. Then, about 0.3-0.4 kg (15-20%) Styrene-Butadiene-Styrene (SBS) Linear co-polymer (M/s LG Ltd make) was added over 15 minutes in reaction vessel. The mixture was stirred at about 160-170° C. for about 2 hrs to ensure dissolution of polymer in bitumen matrix. This matrix was then passed through mill for about 20-30 minutes to reduce polymer particle size and make the matrix homogenous. To this mixture, 4-8 kg of harder grade bitumen/vacuum residue (VG30 in our case) was added to make the effective concentration of SBS polymer in bitumen matrix to 3-5%. Then this mixture was stirred for about 3 hrs at 160-170° C. and passed through mill for about 20-30 minutes to obtain the precursor PMB. This PMB was be used as PMB binder in hot mix asphalt composition preparation and on pavement laying. However, this precursor was further used for manufacturing of better quality PMBE.

2. Manufacturing of PMBE:

Bitumen emulsion was obtained by combining about 60-65% of organic phase (comprising bitumen matrix mixed with solvent (e.g. SKO)) and 35-40% aqueous phase (made of a HCl, amine based emulsifier (any one of Rodhaval CS6/Polyram L920/Redicote 500), calcium chloride, and water) at suitable temperature and is obtained by passing through colloidal mill in bitumen emulsion plant. Organic phase as discussed above was placed in one tank and was maintained at 140-150° C. Aqueous phase as discussed above was taken in another tank and was maintained at room temperature to 50° C. Both these phases were mixed by passing through a colloidal mill at appropriate proportion (predetermined) to obtain PMBE having desired properties (especially higher softening point). Using this process, a better product for micro-surfacing and paving was formulated.

The polymer modified bitumen emulsion was also prepared without using the solvent based on the above described method.

Further, an analysis was performed for investigating the maximum amount SBS polymer that can be dissolved in softer and harder grade bitumen without any additive or catalyst to produce stable PMB and product thereof. The blending properties of bitumen with different percentages of SBS Polymer have been shown in Table 1.

TABLE 1

Blending properties of Bitumen with SBS Polymer

| Type of Bitumen | % Bitumen | % SBS | Intermediate PMB | Remark |
| --- | --- | --- | --- | --- |
| Softer Grade (VG10) | 95 | 5 | Stable | Can be used directly for further blending |
|  | 90 | 10 | Stable but difficult to handle and workability is poor |  |
|  | 85 | 15 |  |  |
|  | 80 | 20 |  |  |
|  | 75 | 25 | Required high temperature, handling, mixing is difficult and further Gel formation occurs. | Not useful. |
| Harder Grade (VG30) | 98 | 2 | Stable | Can be used directly for further blending |
|  | 97 | 3 | Stable |  |
|  | 96.5 | 3.5 | Stable |  |
|  | 96 | 4 | Gel formation | Not useful. |
|  | 95 | 5 | Gel formation |  |

From the above table it can be understood that the requirement of Softening Point in Micro-surfacing can be met by either increasing dosage of SBS polymer in softer grade bitumen or by adding harder grade bitumen into the system while maintaining lower percentage of polymer. Addition of more polymer increases cost of product drastically. Therefore, the later method of co-solubilizing harder grade bitumen (VG 30) with softer grade bitumen (VG10) and polymer matrix yielded a cost effective PMB product. Based on the above table, it is observed that:

SBS Polymer blended with softer grade bitumen (VG10) worked well up to concentration of 5% SBS and was stable and workable. This PMB was emulsified to obtain polymer modified bitumen emulsion (PMBE). However, PMBE developed out if this process did not meet softening point requirement of minimum 57° C. for micro-surfacing of pavements.

With increasing dosage of SBS up to 10%, intermediate PMB obtained, although isolable, was difficult to handle and work with and high temperature (>180° C.) was required for further processing. PMBE formed out of this intermediate PMB was not cost effective.

Using harder grade of bitumen (VG30), PMB and PMBE containing up to 3% SBS was formed. Although stable, PMBE did not meet softening point requirement. While increasing dosage of SBS above 4% lead to gel formation (without any catalyst or additive). Therefore, PMBE with higher polymer content could not be made using only harder grade bitumen. Gel formation was due to higher concentration of asphaltenes in harder grade bitumen (VG30) as compared with softer grade bitumen (VG10).

The PMBE commonly used for micro-surfacing as prepared by the conventional process is characterised based on Indian specification MORTH 5$^{th}$ Edition Table 500-32 as shown in Tables 2.

TABLE 2

Requirement of Modified Bitumen Emulsion for Micro-surfacing (MORTH 5th Edition Table 500-32)

| Test Name | Specification | Test method |
|---|---|---|
| Residue on 600 micron IS Sieve (% by mass), Maximum | 0.05 | IS: 8887 |
| Viscosity by Saybolt Furol Viscometer, at 25° C., in second | 20-100 | IS: 8887 |
| Coagulation of emulsion at low temperature | NIL | IS: 8887 |
| Storage stability after 24 h(168 h), % maximum | 2(4) | IS: 8887 |
| Particle charge | +ve | IS: 8887 |
| Test on Residue: | | |
| Residue by evaporation, % minimum | 60 | IS: 8887 |
| Penetration at 25° C./100 g/5 s | 40-100 | IS: 1203 |
| Ductility at 27° C., cm, minimum | 50 | IS: 1208 |
| Softening point, in ° C., minimum | 57 | IS: 1205 |
| Elastic recovery*, %, minimum | 50 | IS: 15462 |
| Solubility in tri-chloroethylene, %, minimum | 97 | IS: 1216 |

*Elastic recovery is tested for Torsional Elastic Recovery as per Appendix 8 of IRC: 81, the minimum value shall be 20%.

Table 3 describes the some of the typical properties of the PMB developed using varying % of SBS and softer grade bitumen only, while Table 4 describes softening point of the residue of the PMBE obtained using the PMB. The PMB thus obtained was stable but PMBE formed out of this intermediate PMB was not cost effective. Moreover, the resulting PMBE did not show any remarkable improvement in the softening point parameter.

TABLE 3

Blend properties of SBS and VG10 (Softer Grade Bitumen)
Properties of PMB developed using SBS and Softer Grade Bitumen VG10

| Properties | 3% SBS in VG-10 | 3.5% SBS in VG-10 | 4% SBS in VG-10 | 5% SBS in VG-10 | 6% SBS in VG-10 |
|---|---|---|---|---|---|
| Softening point, Deg C., min | 59.5 | 61 | 62 | 64.5 | 67 |
| Elastic Recovery, % min | 70 | 71 | 73 | 75 | 77 |

TABLE 4

Softening Point property of Residue of PMBE developed using SBS and Softer Grade Bitumen (VG10)
Properties of Residue of PMBE developed using SBS and Softer Grade Bitumen VG10

| Properties | 3% SBS in VG-10 | 3.5% SBS in VG-10 | 4% SBS in VG-10 | 5% SBS in VG-10 | 6% SBS in VG-10 |
|---|---|---|---|---|---|
| Softening point, Deg C., min | 53 | 53 | 54 | 56 | 59 |

Table 5 describes the properties of the PMB developed using varying % of SBS together with harder grade and softer grade bitumen prepared based on the co-solubilization process as disclosed in the present invention, wherein harder and softer grades bitumen are co-added. Table 6 describes the typical softening point of residue properties of the PMBE obtained using the PMB. The tables indicated that the PMB obtained by the process of co-solubilization and the PMBE prepared subsequently showed higher softening point. The PMBE thus obtained showed improved properties of the residue after emulsion breaking as required for micro-surfacing.

TABLE 5

Blend properties of PMB developed using Co-solubilization
Properties of PMB developed using co-solubilization

| Properties | 3% SBS in VG10 + VG30 | 3.5% SBS in VG10 + VG30 | 4% SBS in VG10 + VG30 | 4.5% SBS in VG10 + VG30 | 5% SBS in VG10 + VG30 |
|---|---|---|---|---|---|
| Softening point, Deg C., min | 62 | 64 | 70 | 81 | 90 |
| Elastic Recovery, % min | 70 | 72 | 76 | 81 | 87 |

TABLE 6

Blend properties of PMBE developed using PMB obtained by co-solubilization process
Properties of Residue of PMBE developed using co-solubilization

| Properties | 3.5% SBS in VG10 + VG30 PMB (63%) + 3% SKO + 1.2% Rodhaval CS6 | 3.5% SBS in VG10 + VG30 PMB (63%) + 3% SKO + 1.2% Redicote 500 | 3.5% SBS in VG10 + VG30 PMB (63%) + 3% SKO + 1.2% Polyram L920 |
|---|---|---|---|
| Softening point, Deg C., min | 61 | 60 | 62 |

We claim:

1. A co-solubilization process for preparation of a polymer modified bitumen, the process comprising:
   (a) heating a softer grade bitumen to a temperature ranging from 150° C. to 200° C.;
   (b) adding styrene-butadiene-styrene (SBS) linear co-polymer for 10 to 20 minutes to the softer grade bitumen to obtain a mixture;
   (c) dispersing the mixture obtained in step (b) at a temperature ranging from 150° C. to 200° C. followed by milling to obtain a homogenous matrix;
   (d) adding a harder grade bitumen to the homogenous matrix obtained in step (c) to obtain a mixture, wherein the mixture comprises styrene-butadiene-styrene (SBS) linear co-polymer in an amount ranging from 3 to 5% by weight of the mixture; and
   (e) stirring the mixture obtained in step (d) at a temperature ranging from 150° C. to 200° C. followed by milling to obtain the polymer modified bitumen;
   wherein the polymer modified bitumen has a high softening point ranging from 60° C. to 90° C.;
   wherein the softer grade bitumen has absolute viscosity ranging from 800 to 1200 poise at a temperature of 60° C. and the harder grade bitumen has absolute viscosity ranging from 2400 to 3600 poise at a temperature of 60° C.

2. The process as claimed in claim 1, wherein the styrene-butadiene-styrene (SBS) linear co-polymer is added in step (b) in an amount ranging from 15 to 20% by weight of the softer grade bitumen.

3. The process as claimed in claim 1, wherein milling of the mixture in steps (c) and (de) is done for 20 to 30 minutes.

4. A process for preparation of a polymer modified bitumen emulsion, the process comprising:
   (a) heating a softer grade bitumen to a temperature ranging from 150° C. to 200° C.;
   (b) adding styrene-butadiene-styrene (SBS) linear co-polymer for 10 to 20 minutes to the softer grade bitumen to obtain a mixture;
   (c) dispersing the mixture obtained in step (b) at a temperature ranging from 150° C. to 200° C. followed by milling to obtain a homogenous matrix;
   (d) adding a harder grade bitumen to the homogenous matrix obtained in step (c) to obtain a mixture, wherein the mixture comprises styrene-butadiene-styrene (SBS) linear co-polymer in an amount ranging from 3 to 5% by weight of the mixture;
   (e) stirring the mixture obtained in step (d) at a temperature ranging from 150° C. to 200° C. followed by milling to obtain a polymer modified bitumen;
   (f) optionally, mixing the polymer modified bitumen obtained in step (e) with an organic solvent to obtain an organic phase;
   (g) mixing water, an acid, calcium chloride salt solution and an emulsifier to obtain an aqueous phase; and
   (h) mixing the organic phase obtained in step (f) with the aqueous phase obtained in step (g) by milling to obtain the polymer modified bitumen emulsion;
   wherein the softer grade bitumen has an absolute viscosity ranging from 800 to 1200 poise at a temperature of 60° C. and the harder grade bitumen has an absolute viscosity ranging from 2400 to 3600 poise at a temperature of 60° C.

5. The process as claimed in claim 4, wherein the styrene-butadiene-styrene (SBS) linear co-polymer is added in step (b) in an amount ranging from 15 to 20% by weight of the softer grade bitumen.

6. The process as claimed in claim 4, wherein milling of the mixture in steps (c) and (e) is done for 20 to 30 minutes.

7. The process as claimed in claim 4, wherein the organic solvent is selected from Straight run Kerosene Oil (SKO) or Mineral Turpentine Oil (MTO).

8. The process as claimed in claim 4, wherein the aqueous phase comprises: 30 to 35 wt % of water, 1 to 2 wt % of acid, 0.15 to 0.5 wt % of calcium chloride salt solution, and 0.25 to 1.5 wt % of emulsifier; wherein the wt % of each of the components is calculated based on the total weight of the polymer modified bitumen emulsion.

9. The process as claimed in claim 8, wherein the acid in the aqueous phase is a mineral acid.

10. The process as claimed in claim 8, wherein the emulsifier in the aqueous phase is an amine selected from the group consisting of secondary, tertiary amine, and long chain fatty amines.

11. The process as claimed in claim 4, wherein the polymer modified bitumen emulsion is used for microsurfacing flexible pavements, construction and maintenance of roads and pavements, resurfacing and construction of parking lots.

\* \* \* \* \*